United States Patent [19]
Heywang

[11] 3,790,709
[45] Feb. 5, 1974

[54] DEVICE FOR REGISTERING THE INSTANTANEOUS CONTACT PRESSURE OF A PROBE AND FOR THE ELECTRONIC RECORDING OF THE INSTANTANEOUS LOCATION OF A PROBE ON THE SURFACE OF A PLATE

[75] Inventor: Walter Heywang, Neukeferloh, Germany

[73] Assignee: Siemens Aktiengesellschaft, Berlin & Munich, Germany

[22] Filed: Mar. 30, 1972

[21] Appl. No.: 239,641

[52] U.S. Cl. .................................. 178/18, 310/9.8
[51] Int. Cl. ............................................. G08c 21/00
[58] Field of Search..... 178/18, 19, 20; 310/9.8, 9.7

[56] References Cited
UNITED STATES PATENTS

| 3,684,828 | 8/1972 | Maher | 178/18 |
| 3,134,099 | 5/1972 | Woo | 178/18 |
| 3,657,475 | 4/1972 | Peronneau et al. | 178/18 |
| 3,618,019 | 11/1971 | Nemirovsky et al. | 178/18 |
| 3,582,839 | 6/1968 | Pim | 310/9.8 |
| 3,562,792 | 6/1968 | Berlincourt | 310/9.7 |
| 3,528,295 | 6/1968 | Johnson | 178/18 |

OTHER PUBLICATIONS
IBM Technical Disclosure Bulletin, "Acoustical Data Input Panel," J. B. Gunn. Vol. 12, No. 3, Aug. 1969.

Primary Examiner—Kathleen H. Claffy
Assistant Examiner—Kenneth Richardson
Attorney, Agent, or Firm—Hill, Sherman, Meroni, Gross & Simpson

[57] ABSTRACT

A device for registering the instantaneous contact pressure of a probe which is being used as a writing instrument on a piezoelectric plate or on a sheet of paper resting on a piezoelectric plate, and to the combination of such a device in a system for electronically registering the instantaneous location of a probe on the surface of such a plate. The plate in such a system has permanent polarization in a predetermined direction. Essentially strip-shaped electrodes are arranged at adjacent edges on the upper surface of the plate. The probe is provided with an electrode at its tip and its tip is pressed against the plate, or the paper, when it is being used for writing. The system is designed in particular for the instantaneous recording of a character pattern which is written with a probe, which may, for example, be a pen or a stylus.

10 Claims, 2 Drawing Figures

DEVICE FOR REGISTERING THE INSTANTANEOUS CONTACT PRESSURE OF A PROBE AND FOR THE ELECTRONIC RECORDING OF THE INSTANTANEOUS LOCATION OF A PROBE ON THE SURFACE OF A PLATE

CROSS-REFERENCE TO RELATED APPLICATIONS

In an application, assigned to the same assignee as the present application filed concurrently herewith and identified as Case No. 72,180, a device for registering the instantaneous location of a probe is disclosed in which a piezoelectric plate is alternately excited at two nonparallel edges by electrically controlled coupling means, preferably electrodes to produce wave train pulses and in which the local mechanical vibration in the piezoelectric plate is accompanied by an alternating voltage therein. At the probe this voltage is picked up by the probe between the probe electrode and its associated electrode. The receipt of this generated voltage is compared timewise with the timing of the pulsed voltage to the means preferably electrode pairs at the side edges of the plate.

In another application, assigned to the same assignee as the present application, filed concurrently herewith and identified as Case No. 72,182, an arrangement generally similar to that of Case No. 72,180 is disclosed with the exception that the mechanical wave trains are pulsed from the probe electrode and the edge located electrodes act as the sensing mean. The time it takes for a pulsed wave train to travel from the probe to the edge electrode pairs, respectively, is determined and registered.

BACKGROUND OF THE INVENTION

1. Field of the Invention

This invention relates in general to a system which is designed to record the movement of a probe or stylus on a plate such, for example, as handwriting, signatures, or line drawings and either reproduce them at the time or store them in a storage memory and reproduce them at a later time and to means for determining the contact pressure of the probe.

2. Description of the Prior Art

The broad concept of providing a device for the electronic recording of the instantaneous location of a sensing probe is known with which mechanical surface waves are coupled into a glass plate through means arranged at a pair of adjacent edges of the glass plate. The coupling means are arranged in such a way that they are able to transmit surface waves in orthogonal directions, that is, in the $x$- direction and $y$- direction.

One system of this type is described in IEEE Transactions on Electronics Computers, October 1964, pp. 609–611. In this prior art system, mechanical surface waves moving through a glass plate can be detected by a sensing probe for sensing mechanical oscillations. The probe comprises a transducer to change the picked up mechanical oscillations into electric signals which, in turn, are fed to an evaluation device which evaluates them.

In this prior art device, the impulse-shaped wave packages of high frequency oscillations, for example, 25 MHz, are coupled into the glass plate sequentially with respect to time for the $x$- direction and the $y$- direction, respectively. In this manner each point of the surface through which are two waves more is recorded and precisely located by two coordinates. With the help of the evaluation device, the transit time of each respective wave from its production until its reception at the location of the probe is detected and registered. From the transit time for wave packages in the $x$- direction and the transit time for waves in the $y$- direction, the $x$- and $y$- coordinates of the instantaneous location of the probe are detected. Means is provided for substantially complete absorption of those wave packages which have crossed the plate and hence no false reading is obtained by a reflected wave.

The sequential timing of the transmission of the wave packages through the plate are effected so rapidly that a movement of the probe, for instance, according to writing speeds for handwritten character patterns, can almost always be followed and recorded.

A piezoelectric sensing system is provided for the probe, as it is applied, for instance, for sound pickups.

Other systems have also been provided in the past for registering the instantaneous position of a probe on a plate such, for example, as provided in a close raster on the surface of the plate made up of crossed, strip-shaped electrodes which are insulated from each other. The resolution power of the device of this character, however, is limited due to the density of the electrode strips.

Still another form of prior art device in this general field is a device which employs a plate with a continuously electrically conductive surface and which has alternating currents fed in at its edges according to a predetermined scheme. The scheme is selected in such a way that due to the potential distribution in the surface each location has a clearly defined alternating potential which can be sensed with the probe. This type of system, however, requires homogeneous conductivity in the surface and an expensive electronic system for feeding and evaluating the detected potentials.

A further similar device provides that surface waves are coupled in $x$- and $y$- directions in a glass plate with the help of piezoelectric excitations the echo is recorded which is returned from the place of the probe. One disadvantage of this system is that the echo which is reflected from a pointed probe has very little energy.

SUMMARY OF THE INVENTION

The broad aspects of the present invention and to the system in which it is preferably used are set forth in the abstract. In this connection, it is to be noted that it is an object of this invention to utilize a piezoelectric material plate on which a probe is used to write or draw and in which the contact pressure of the probe is determined by recording the alternating electric voltage that it produces in the material due to the piezoelectrical property of said material and due to said pressure applied to said material. The alternating voltage produced piezoelectrically by said pressure is of lower frequency than that used to determine the location of the probe.

In a system for giving an indication of the instantaneous location of the probe, electric pulses are supplied either across the probe electrode and the electrode on the underside of the plate, or sequentially across the strip electrodes and their associated electrode, to produce mechanical wave trains whose fronts travel across the plate between the probe electrode to the strip-shaped electrodes, or vice versa. The mechanically vibrating piezoelectric material between the sensing electrodes resulting from a mechanical wave train reaching the same electrodes produces an alternating voltage across the sensing electrodes. This voltage is transferred to the registering device where the time of its reception and the time when the exciting electrodes were energized is compared to measure the transit times of the mechanical wave trains between the exciting electrodes and the sensing electrodes. By measuring the relative transit time, the exact location of the probe at each instant of time is determined.

The present invention includes the novel feature of indicating the contact pressure of a probe on a piezoelectric plate. Due to piezoelectric property of the material of the plate with a low frequency alternating voltage is produced in the plate by the pressure of the tip of the probe at the plate. The probe being moved on the surface of said plate. The variation in amplitude of this low frequency voltage appearing across confronting electrodes on opposite sides of the plate detects the amount of the contact pressure of the tip. Preferably the probe and its backside electrode being the signal sensing electrodes for this signal. This arrangement can be employed in a system for instantaneously indicating the location of the probe as it moves over a piezoelectric plate since the signals for locating the coordinates of the probe are high frequency pulses which can be separated from and distinguished over the low frequency signals.

This low frequency voltage also can be receipted between said second pair of electrodes and between said third pair of electrodes.

DESCRIPTION OF THE PREFERRED EMBODIMENTS

Figure 1:
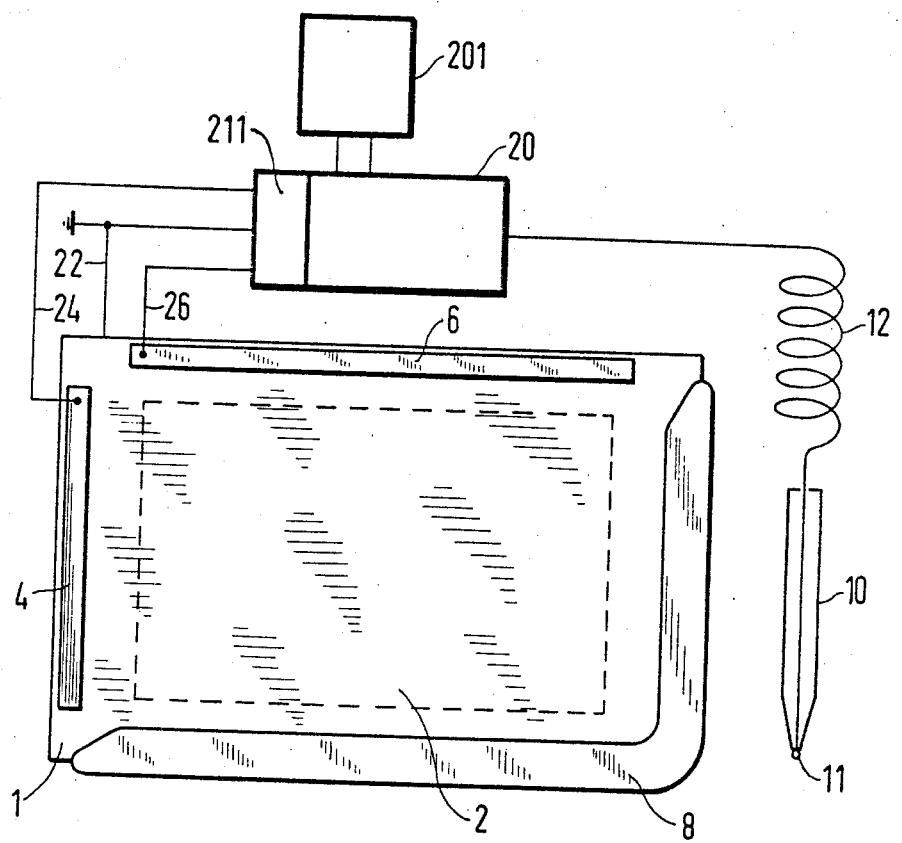
FIG. 1 is a diagrammatic view of a device formed according to the present invention, along with its associated evaluation device and probe.

In FIG. 1 of the drawings, a piezoelectric plate 1 is shown. Preferably, this plate is permanently polarized in the direction of its thickness. Electrodes 4 and 6 are provided on the surface 2 of plate 1 at two nonparallel edges thereof. An opposite electrode (not shown) is attached to the underside of the plate 1. The electrodes 4 and 6 and the opposite or underside electrode are electrically connected through conductors 24, 26 and 22, respectively, to an electronic circuit 211. This electronic circuit part 211 is diagrammatically shown as being connected to the evaulation device 20. In part 211 the high frequency impulse signals are generated. These signals are applied to the electrodes 4 or 6, respectively, by which the waves are to be coupled into the material of the plate 2. The conductive tip 11 of the probe 10, is also electrically connected through a conductor 12 to the evaulation device 20, which may be of any known design for registering, comparing and storing information supplied thereto by electric signals.

In accordance with the present invention, the evaulation device is arranged to detect the height of the pressure of the probe tip on the piezoelectric plate by noting the differences in electric potential which are produced piezoelectrically as a result of the contact pressure of probe tip 11 at the plate 1.

The present invention is primarily designed for use with a system which locates the position of a probe on a plate as it moves thereover. In FIG. 1 the location of the probe on a plate is determined by supplying high frequency pulses produced by circuit 211 sequentially to electrode 4 and then electrode 6 to internally excite the piezoelectric material therebelow and produce wave trains which spread across the plate to the probe 10. Here a piezoelectrically produced voltage is received. The evaluation device then compares the exciting time with the arrival time, and the distance of the probe electrode from electrode 4 and 6 is thereby determined. The location can also be determined, as in FIG. 2, by the same technique except that the probe electrode is the excitation electrode supplied by a circuit 21 for producing high frequency pulses and the electrodes 4 and 6 are the ones with which a piezoelectrically produced voltage in the plate is received.

The present invention provides indication means of the contact pressure of the probe at the plate. A relatively low frequency signal is caused by the pressure applied to the piezoelectric material, at the tip 11 of the probe 10. The variations of contact pressure of the probe results in a variation in magnitude of the voltage of the low frequency signal appearing across sensing electrodes. In the embodiment of FIG. 1 the electrode of the probe is used for sensing electrodes.

Since the frequencies of signals are different, the piezoelectric produced contact pressure signal can be sent through the same conductor as the location indicating signal to the evaluation device 20. Here the signals are separated and are then passed to visual indicator 201 where the pressure signal controls the brightness of the visual image.

An acoustic sump 8 is provided at the edges opposite to the edge where electrodes 4 and 6 are located. This sump damps the mechanical wave trains after they have crossed the plate and substantially eliminates reflections. The sump 8 is made of any suitable material which absorbs mechanical vibrations.

The form of system shown in FIG. 1 is essentially designed for one which excites the electrodes 4 and 6 and the sensing device in the probe 10.

Figure 2:
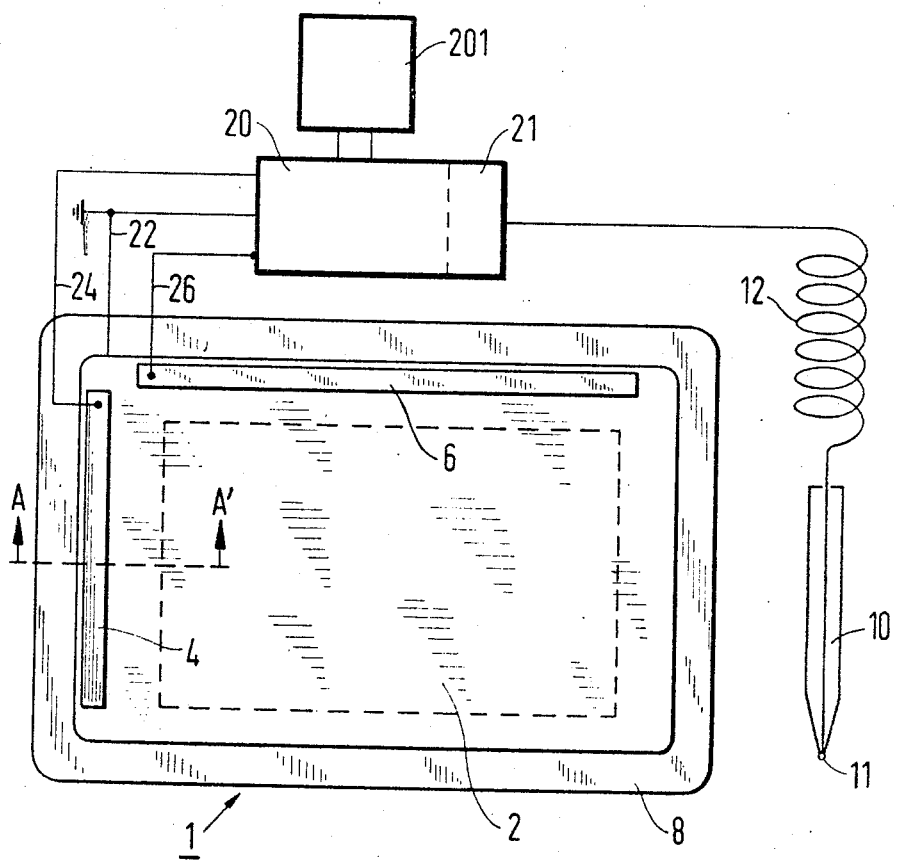
FIG. 2 is a diagrammatic view of a variation of the present invention.

FIG. 2 illustrates a system which is essentially designed for use where the probe is excited and produces mechanical wave trains in the plate and the electrodes 4 and 6 are the sensing electrodes. The sump 8 extends substantially completely around the edges of the plate 10. 21 is the electronic circuit part which is connected with the evaluation device 20 and in which the impulse signal is produced which is to be coupled into the material of the plate 2 by the probe electrode 11 to produce wave trains.

The recording of the signal produced by the contact pressure, is provided for the evaluation according to that described in connection with FIG. 1. The low frequency contact pressure signal whose amplitude variations are caused by variation of the contact pressure may be recorded at the electrodes 4 and 6. This signal also can be recorded at the electrode 11.

I claim as my invention:

1. A device for locating the instantaneous position of a writing probe as it moves over a piezoelectric plate and for indicating the relative pressure of the contact of the probe on said plate comprising a plate of piezoelectric material, a probe having a first electrode at its tip which contacts the upper surface of said plate as it is used to write, a second electrode extending over substantially the entire under surface of said plate, third and fourth electrodes on the upper surface of said plate adjacent two nonparallel edges, said first and second electrodes providing a first pair of electrodes, said third electrode and said second electrode providing a second pair of electrodes, said fourth electrode and said second electrode providing a third pair of electrodes, means for energizing said first pair with high frequency electrical pulses to produce wave trains crossing the plate whereby signals are generated piezoelectrically sequentially across said second pair and said third pair, means for detecting the time difference between excitation at said first pair and said generation of the detected pulses at said second and third pair, respectively, and means for detecting and registering, a lower frequency voltage than said high frequency pulses, piezoelectrically produced by the pressure of the tip of said probe at the plate, thereby to indicate the relative contact pressure of said probe.

2. A device according to claim 1 in which a display means is included which is energized by said detected voltage and which by its brightness indicates the relative contact pressure of said probe on said plate.

3. A device according to claim 1 in which said piezoelectric plate is vertically polarized.

4. A device for locating the instantaneous position of a writing probe as it moves over a piezoelectric plate and for indicating the relative pressure of the contact of the probe on said plate comprising a plate of piezoelectric material, a probe having a first electrode at its tip which contacts the upper surface of said plate as it is used to write, a second electrode extending over substantially the entire under surface of said plate, third and fourth electrodes on the upper surface of said plate adjacent two nonparallel edges, said first and second electrodes providing a first pair of electrodes, said third electrode and said second electrode providing a second pair of electrodes, said forth electrode and said second electrode providing a third pair of electrodes, means for energizing said second and third pairs sequentially with high frequency electrical pulses, to produce wave trains crossing the plate whereby signals are generate piezoelectrically across said first pair, means for detecting the time difference between excitation of said second pair and said generation of detected pulses at said first pair, means for detecting the time difference between excitation of said third pair and said generation of detected pulses at said first pair, means for registering and indicating the position of said probe from two sets of time differences, means for simultaneously energizing said second and third pairs and means for detecting and registering a lower frequency voltage than said high frequency pulses, piezoelectrically produced by the pressure of the tip, thereby to indicate the relative contact pressure of said probe.

5. A device according to claim 1 in which a sheet of paper overlies said plate and lies between said probe and said plate.

6. A device according to claim 1 in which a sheet of paper overlies said plate and lies between said probe and said plate.

7. A device according to claim 1 wherein the lower frequency voltage signal is received by said first pair of electrodes, said pair of electrodes being connected with said detecting and registering means.

8. A device according to claim 1 wherein the lower frequency voltage signal is received by one of the second or third pair of electrodes, said pair of electrodes being connected with said detecting and registering means.

9. A device according to claim 4, in which a display means is included which is energized by said detected voltage and which by its brightness indicates the relative contact pressure of said probe on said plate.

10. A device according to claim 4, in which said piezo electric plate is vertically polarized.

* * * * *